Aug. 11, 1964 E. A. PETERSON ETAL 3,144,372
METHOD OF HEAT AND TEAR SEALING POLYURETHANE
FOAM MATERIAL TO THERMOPLASTIC FILM
Filed June 8, 1959 2 Sheets-Sheet 1
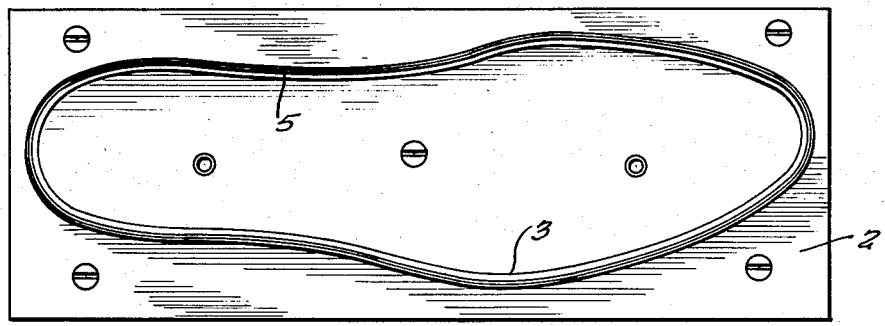
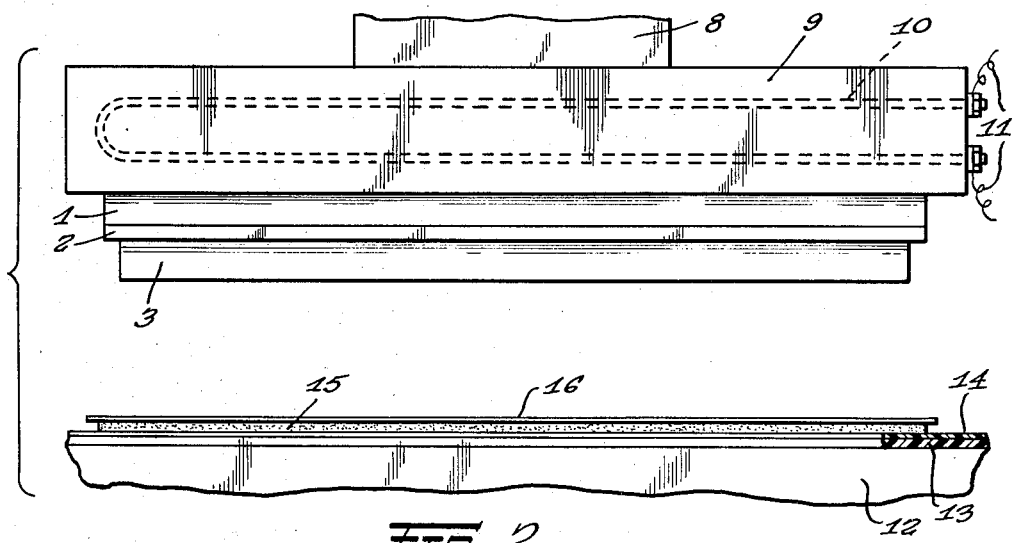
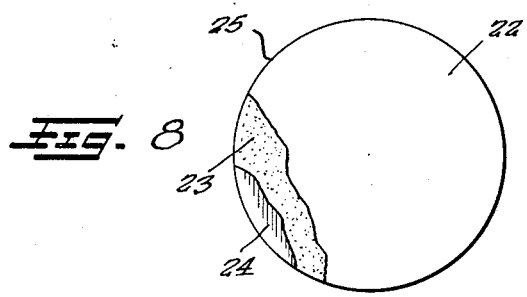
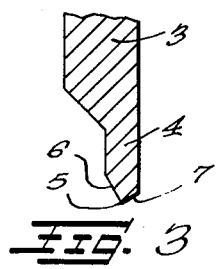
Inventors
Everett A. Peterson
Harold W. Peterson
By Hill, Sherman, Meroni, Gross & Simpson Attys Inventors
Everett A. Peterson
Harold W. Peterson United States Patent Office 3,144,372
Patented Aug. 11, 1964

3,144,372
METHOD OF HEAT AND TEAR SEALING POLYURETHANE FOAM MATERIAL TO THERMOPLASTIC FILM
Everett A. Peterson, Roslyn Heights, and Harold W. Peterson, Roslyn, N.Y., assignors to Peterson Electronic Die Co., Inc., New York, N.Y., a corporation of New Jersey
Filed June 8, 1959, Ser. No. 818,847
1 Claim. (Cl. 156—251)

This invention relates to improvements in a heat sealing electrode die and process of heat sealing, the invention being highly desirable for use in connection with the heat sealing of a sheet of chemical or thermoplastic foam material to a sheet or layer of thermoplastic film and to a commercially satisfactory method of effectuating such a union in the mass production of various products, although the invention may have other uses and purposes as will be apparent to one skilled in the art.

It is now desirable to manufacture many articles from which a cushioning effect is desired by uniting laminations of thermoplastic foam material of the flexible cushioning type and thermoplastic film, the number of laminations utilized in the finished article being dependent upon the performance expected from a particular article or upon the size desired. Among such articles are seat and stool cushions, bath mats, various types of table pads, and various other forms of appliances and devices wherein it is desirable to have a relatively durable cover over at least one face of the foam material. Such materials are highly desirable for foot cushioning and corrective devices such as insoles, arch supporting structures, callus, corn or bunion alleviators, simple bandages, plasters, and the like of many and various types, both which can be disposed freely within an article of footwear, adhesively secured therein, and in some instances adhesively or otherwise attached directly to the foot or body of the user.

Heretofore, while various articles have been made with vinyl foam heat sealed to a vinyl film, in a commercially satisfactory process with a minimum of operations, extreme difficulty has been experienced in endeavoring to unite a polyurethane foam to a thermoplastic film or the equivalent, or even to another sheet of foam, and acquire a satisfactory seal by a commercially satisfactory and sufficiently economical process. It is desirable to provide in a single operation an article having a fine line heat seal seam without any laterally projecting flange, and at the same time the heat seal seam is provided, a tear line should be provided at the outside of the seam so that the article may be readily removed from waste stock material. Frequently, heretofore, where polyurethane foam was utilized it thickened materially at the seam, could not be torn away from the waste stock, and a separate cutting operation would be necessary to remove the article from the stock waste, an operation extremely unsatisfactorily if not prohibitively expensive in commercial manufacture. In other instances, it was virtually impossible to establish a satisfactory heat seal seam, and in still further cases such a seam could not be acquired in the form of a fine line seam substantially the thickness of the film alone at the seam, and of a substantially flangeless type. While such had been acquired commercially utilizing a vinyl foam, polyurethane foam has certain attributes over the vinyl foam, including higher thermal insulation value, better durability by virtue of the lack of plasticizers, and it is also far more economical to produce.

Polyurethane foam, sometimes referred to as polyester foam, is usually made by combining polyester resins with isocyanates, such as by the poly-addition of di- or poly-isocyanates with suitable polyesters, and varying the ingredients produces foams of different elasticities or densities. Accordingly, the term polyurethane will be herein used as generic of polyurethane foams, polyester foams, isocyanate foams, and similar terminology that may be used commercially.

In view of the foregoing, it is an important object of the instant invention to provide an electrode die capable of adequately heat sealing polyurethane foam to a thermoplastic film or the like in a single operation and at the same time provide a readily disruptible tear line immediately adjacent the heat seal seam.

Also a feature of this invention is the provision of an electrode die capable of heat sealing a thick layer of polyurethane foam to a thin thermoplastic film and provide a fine line substantially flangeless heat seal seam.

Also a feature of the invention is the provision of an electrode die operable upon superposed sheets of polyurethane foam and a thermoplastic film, the die being shaped to form the bounding edge of the article being produced, and not only establish the article with the sheets joined together in a fine line heat seal seam, but in the same operation establish a tear line so that the article may easily be removed from the waste material.

It is also a feature of this invention to provide a new and novel method of heat sealing a thermoplastic foam to a thermoplastic film or the equivalent.

It is a further object to provide a new and novel method of heat sealing a polyurethane foam to a thermoplastic film.

While some of the more salient features, characteristics and advantages of the instant invention have been above pointed out, others will become apparent from the following disclosures, taken in conjunction with the accompanying drawings, in which FIGURE 1 is a bottom plan view of an electrode die embodying principles of the instant invention;

FIGURE 2 is a fragmentary side elevational view, with parts shown in section, illustrating an assembly and the general operation or use of the die of FIG. 1;

FIGURE 3 is a greatly magnified vertical sectional view, fragmentary in character, of the operating portion or knife edge of the die;

FIGURE 8 is a plan view, with parts broken away, illustrating a different form of product comprising more than two laminations.

As shown on the drawings:

Figure 4:
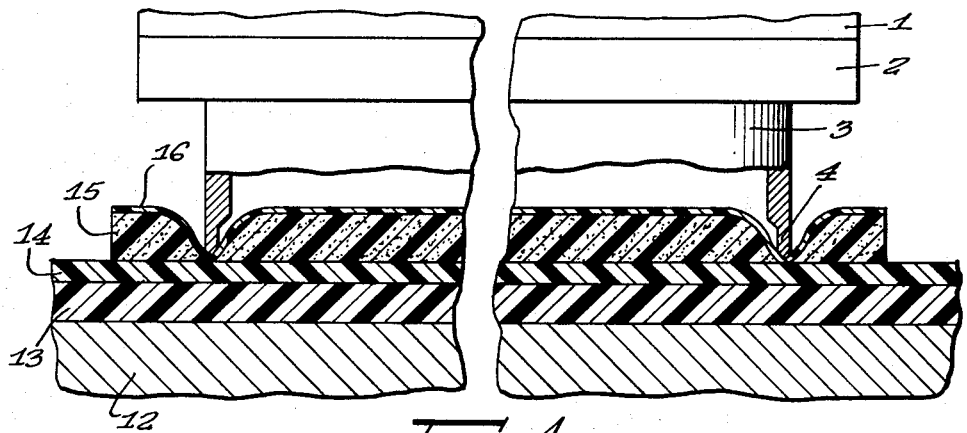
FIGURE 4 is an enlarged fragmentary part sectional, part elevational view illustrating the formation of an article or product by the die of FIG. 1.
Figure 5:
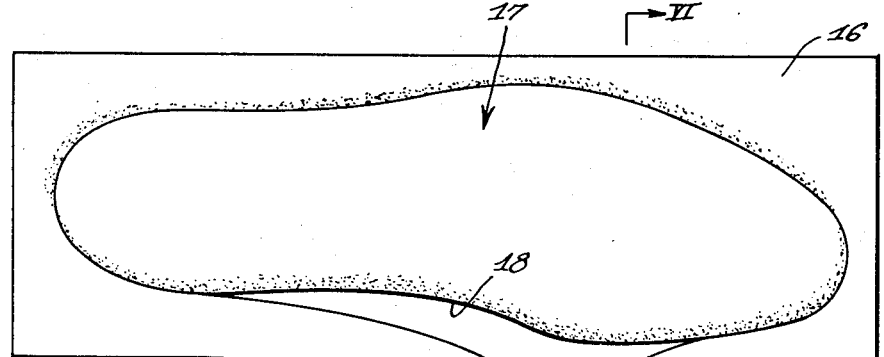
FIGURE 5 is a plan view of a finished product illustrating how the same is readily removable from the waste stock material.

While full or partial layers exceeding two in number of either the foam or the film may be utilized by way of the instant invention in the manufacture of various products, for simplicity and clarity the invention will be described herein in connection with the making of a cushion type insole for an article of footwear, which insole embodies but a single sheet of film and a single sheet of foam.

In the illustrated form, the electrode die may comprise a base 1, a holding plate 2, and a die member 3, all of which are of electrically conductive material. With reference to FIGURE 1, it will be seen that the die element 3, which may satisfactorily be a strip of brass properly shaped, is in the form of the outline of the desired product, and defines the bounding edge of the product, which in this instance is an insole for the left foot. Obviously, an allochiral die would be used to provide insoles for the right foot.

With reference now to FIG. 3, it will be seen that the die element 3 has depending therefrom a thinner portion 4 which terminates in a knife edge 5 defined by a pair of intersecting bevels 6 and 7. It is preferred to have one of the bevels at a materially less angle to the horizontal than the other, or in other words one of the bevels is substantially flatter than the other. Since the instant die encloses the article to be formed, it is preferable to have the outer bevel 7 more nearly approaching the horizontal than the inner bevel 6. By way of example, and not by way of limitation, it may be stated that the bevel 7 can be satisfactorily 30° to 45° to the horizontal, while the bevel 6 may be disposed at an angle of 60° to the horizontal, or approximately twice the angle of the bevel 7.

The aforesaid die may be utilized in a known form of electronically heat sealing press capable of passing a high frequency electrical current through the die. As diagrammatically indicated in FIG. 2, the press may include a vertically reciprocable plunger 8, actuated by any suitable means, and from which the die depends. The die may be provided with a top housing 9 containing an electrical heating element 10 connectable to any suitable source of current by means of conductors 11, if so desired. Such an element would effect a preheating of the die, which might be desirable in some cases, but which is not deemed essential to the present invention. The conductors 11 would lead to an entirely different source of current than is utilized for the electronic or high frequency arrangement associated with the press.

The press also includes a conductive base plate 12 which forms the other electrode, and this may have a flat upper face, only one shaped die being necessary. It is frequently desirable to use a buffer on the base electrode 12, which may be in the form of a dielectric plate 13; should that buffer be a material to which polyurethane foam may adhere, such as a phenolic condensation product, it is desirable to use a second buffer, and a satisfactory material to prevent adherence of polyurethane foam is a plastic product commercially known as "Teflon," indicated at 14.

On top of the buffer means a sheet 15 of polyurethane foam may be disposed, and a thermoplastic film 16 laid over that sheet. It is not essential that the film sheet be on top of the foam sheet, since the die will operate satisfactorily regardless of which sheet it actually contacts. Various thermoplastic films may be used, unsupported vinyl film being quite satisfactory for the purpose.

Figure 6:
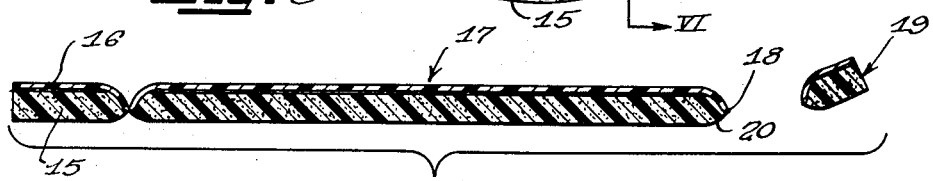
FIGURE 6 is a fragmentary vertical sectional view taken substantially as indicated by the lines VI—VI of FIG. 5.

When the superposed sheets are in position, the die is forced down against them as indicated in FIG. 4, the die firmly pressing the sheets in order to establish a fine line heat seal seam. When the die is positioned firmly pressed into the superposed sheets, a high frequency electric current is passed through the die in order to effect the heat sealing operation. Thus, in a single operation the die defines the product, an insole generally indicated by numeral 17 in the illustrated showing, and the two sheets of material are joined at their bounding edges by a fine line heat seal seam 18. At the same time the seam is formed, a tear line is also provided immediately adjacent the seam from which the waste material, generally indicated by numeral 19, is readily separated from the finished product. No cutting is necessary, it being a simple expedient to pull the waste or the product one from the other. As seen best in FIG. 6, it will be noted that the two sheets are secured together at the heat seal seam 18 only, and being otherwise unattached. As indicated at 20 in FIG. 6, it will also be noted that the marginal portion of the thicker foam layer is curved toward the fine line heat seal seam, so that the finished product has a pleasing appearance and better fits in its desired location.

Figure 7:
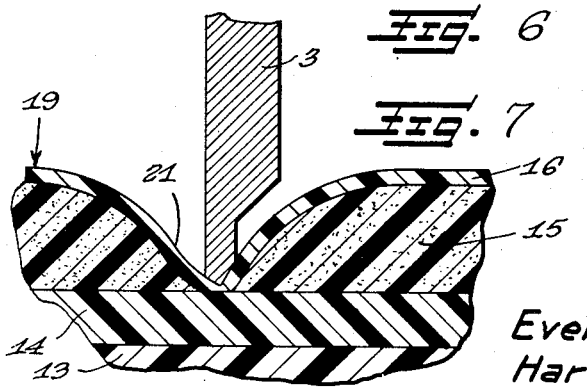
FIGURE 7 is a greatly enlarged view similar in character to the lefthand portion of FIG. 4, illustrating the action of the die in establishing the conjoint heat seal seam and tear line.

The action of the die in forming a fine line heat seal seam with polyurethane foam is illustrated best in FIG. 7. As the die presses into the superposed sheets or laminations, the inner and more sloping bevel 6 provides a curved margin in the product being made, while the outer flatter bevel 7 pushes the material of the foam sheet outwardly, as indicated by numeral 21, to a much greater extent, forcing more of that material into the waste outside of the heat seal seam. In this manner less of the foam material is compressed into the heat seal seam, and a fine line seam is possible, and a readily disruptible tear line is established.

In FIGURE 8 we have illustrated a different product as exemplary of the fact that the die may be made of any desirable shape and size. In this instance, we have shown a cushion for a stool or the like which comprises a top sheet 22 of thermoplastic film, an intermediate sheet or lamination 23 of polyurethane foam, and a lower sheet 24, which may also be of thermoplastic film. All three sheets are joined together by a fine line heat seal seam 25 in the manner above described.

From the foregoing, it is apparent that we have provided not only a die capable of establishing a fine line heat seal seam as well as a tear line to join a sheet of polyurethane foam to a thermoplastic film, but also an extremely economical method involving only a single operation of heat sealing polyurethane foam.

It will be understood that modification and variations may be effected without departing from the scope of the novel concepts of the present invention.

We claim as our invention:

The method of heat and tear sealing polyurethane foam material to a thermoplastic film, including the steps of superposing sheets of polyurethane foam and thermoplastic film, impressing a cold electrode die into line contact with the foam in a manner to define at least a part of the bounding edge of a product, in the same operation forcing material of the foam sheet laterally away from the bond line on both sides thereof at angles of approximately 60° on the product side and 30° to 45° on the other side with respect to the plane of the foam to insure a readily disruptible tear line around the bond line, and passing a high frequency current through said die.

References Cited in the file of this patent

UNITED STATES PATENTS

| | | |
|---|---|---|
| 1,352,383 | Riley | Sept. 7, 1920 |
| 1,644,122 | Griffiths | Oct. 4, 1927 |
| 2,510,383 | Dalgleish | June 6, 1950 |
| 2,631,646 | Gannon | Mar. 17, 1953 |
| 2,681,296 | Dobbs | June 15, 1954 |
| 2,706,165 | Korsgaard | Apr. 12, 1955 |
| 2,917,842 | Scholl | Dec. 22, 1959 |
| 3,020,186 | Lawrence | Feb. 6, 1962 |
| 3,026,233 | Scholl et al. | Mar. 20, 1962 |